US012795096B2

(12) United States Patent

Jiang et al.

(10) Patent No.: US 12,795,096 B2
(45) Date of Patent: Nov. 10, 2026

(54) SYSTEMS AND METHODS FOR TRANSFORMATION BASED ON AN INTRA BLOCK COPY (IBC) MODE

(71) Applicant: ZHEJIANG DAHUA TECHNOLOGY CO., LTD., Hangzhou (CN)

(72) Inventors: Dong Jiang, Hangzhou (CN); Zhu Hong, Hangzhou (CN); Xiuli Chen, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 144 days.

(21) Appl. No.: 18/320,167

(22) Filed: May 18, 2023

(65) Prior Publication Data

US 2023/0291901 A1 Sep. 14, 2023

Related U.S. Application Data

(63) Continuation of application No. PCT/CN2021/135868, filed on Dec. 6, 2021.

(30) Foreign Application Priority Data

Dec. 6, 2020 (CN) ........................ 202011419551.3

(51) Int. Cl.
*H04N 19/12* (2014.01)
*H04N 19/176* (2014.01)
(Continued)

(52) U.S. Cl.
CPC ........... *H04N 19/12* (2014.11); *H04N 19/176* (2014.11); *H04N 19/593* (2014.11); *H04N 19/61* (2014.11)

(58) Field of Classification Search
CPC .... H04N 19/12; H04N 19/176; H04N 19/593; H04N 19/61; H04N 19/157; H04N 19/625; H04N 19/18
(Continued)

(56) References Cited

U.S. PATENT DOCUMENTS

2014/0010292 A1* 1/2014 Rapaka ................ H04N 19/147 375/240.12
2017/0070748 A1* 3/2017 Li ........................ H04N 19/176
(Continued)

FOREIGN PATENT DOCUMENTS

CN 109819250 A 5/2019
CN 110636313 A 12/2019
(Continued)

OTHER PUBLICATIONS

International Search Report in PCT/CN2021/135868 mailed on Feb. 24, 2022, 4 pages.
(Continued)

*Primary Examiner* — Jamie J Atala
*Assistant Examiner* — Mahmoud Kamal Abouzahra
(74) *Attorney, Agent, or Firm* — METIS IP LLC

(57) ABSTRACT

The present disclosure is related to systems and methods for transformation based on an intra block copy (IBC) mode. The method includes obtaining a set of candidate transformation results by performing a set of candidate transformation modes on a first block in an image. The set of candidate transformation modes include at least one of a first transformation mode, a secondary transformation mode, or a sub-block transformation mode. The method includes determining a target transformation mode for the first block based on the set of candidate transformation results.

19 Claims, 10 Drawing Sheets

(51) Int. Cl.
*H04N 19/593* (2014.01)
*H04N 19/61* (2014.01)

(58) Field of Classification Search
USPC .................................................... 375/240.02
See application file for complete search history.

(56) References Cited

U.S. PATENT DOCUMENTS

| | | | | |
|---|---|---|---|---|
| 2018/0020218 | A1* | 1/2018 | Zhao | H04N 19/124 |
| 2019/0215516 | A1 | 7/2019 | Lim et al. | |
| 2020/0021835 | A1 | 1/2020 | Xu et al. | |
| 2020/0322623 | A1* | 10/2020 | Chiang | H04N 19/46 |
| 2020/0336735 | A1* | 10/2020 | Chang | H04N 19/13 |
| 2021/0211727 | A1 | 7/2021 | Salehifar et al. | |
| 2021/0297657 | A1* | 9/2021 | Lee | H04N 19/132 |
| 2021/0352326 | A1* | 11/2021 | Lim | H04N 19/159 |
| 2022/0007057 | A1* | 1/2022 | Liu | H04N 19/122 |
| 2022/0030280 | A1 | 1/2022 | Zhu et al. | |
| 2022/0086451 | A1* | 3/2022 | Bae | H04N 19/176 |
| 2022/0174269 | A1 | 6/2022 | Yoo et al. | |
| 2022/0174299 | A1* | 6/2022 | Zhang | H04N 19/176 |
| 2022/0295061 | A1* | 9/2022 | Zhang | H04N 19/176 |
| 2022/0303535 | A1* | 9/2022 | Poirier | H04N 19/182 |
| 2022/0368949 | A1* | 11/2022 | Jung | H04N 19/11 |
| 2022/0377336 | A1 | 11/2022 | Salehifar et al. | |
| 2023/0199185 | A1* | 6/2023 | Zhang | H04N 19/122<br>375/240.02 |
| 2023/0300334 | A1* | 9/2023 | Zhang | H04N 19/167<br>375/240.12 |

FOREIGN PATENT DOCUMENTS

| | | | |
|---|---|---|---|
| CN | 112565754 | A | 3/2021 |
| WO | 2015131323 | A1 | 9/2015 |
| WO | 2018013953 | A1 | 1/2018 |

OTHER PUBLICATIONS

Written Opinion in PCT/CN2021/135868 mailed on Jun. 23, 2022, 5 pages.

First Office Action in Chinese Application No. 202011419551.3 mailed on Jun. 1, 2022, 18 pages.

Telecommunication Standardization Sector of ITU, ITU-T H.265, 2015, 635 pages.

Jason Jung et al., Non-CE6: Mismatch Between Text Specification and Reference Software on MTS for IBC-coded Block, Joint Video Experts Team of ITU-T SG 16 WP 3 and ISO/IEC JTC 1/SC 29/WG 11, 2019, 4 pages.

Xu, Xiaozhong et al., Overview of Screen Content Coding in Recently Developed Video Coding Standards, IEEE Transactions on Circuits and Systems for Video Technology, 2020, 11 pages.

Zhao, Yin et al., CE6: Sub-Block Transform for Inter Blocks (Test 6.4.1), Joint Video Experts Team of ITU-T SG 16 WP 3 and ISO/IEC JTC 1/SC 29/VG 11, 2019, 10 pages.

The Extended European Search Report in European Application No. 21900136.9 mailed on Jan. 24, 2024, 14 pages.

* cited by examiner

| Coding unit definition | Descriptor |
|---|---|
| coding_unit(x0, y0, width, height, mode, component) { | |
| ... | |
| if (! IntraCuFlag ~~&& ! IbcCuFlag~~ && ! IscCuFlag) { | |
| ...... | |
| if (SbtEnableFlag && (width <= 64) && (height <= 64) && (width > 4 \|\| height > 4) && (InterpfFlag == 0) && ctp_y[0] ) { | |
| sbt_cu_flag | u(1) |
| if (SbtCuFlag) { | |
| SbtVerHalf = width >= 8 | |
| SbtVerQuad = width >= 16 | |
| SbtHorHalf = height >= 8 | |
| SbtHorQuad = height >= 16 | |
| if ( (SbtVerHalf \|\| SbtHorHalf) && (SbtVerQuad \|\| SbtHorQuad) ) { | |
| sbt_quad_flag | ae(v) |
| } | |
| if ( (SbtQuadFlag && SbtVerQuad && SbtHorQuad) \|\| (!SbtQuadFlag && SbtVerHalf && SbtHorHalf)) { | |
| sbt_dir_flag | ae(v) |
| } | |
| sbt_pos_flag | ae(v) |
| } | |
| } | |
| ... | |
| } | |

FIG. 6

| Transform block definition | Descriptor |
|---|---|
| block(i, blockWidth, blockHeight, CuCtp, isChroma, isPcm, isIntra, component) { | |
| … | |
| if (SecondaryTransformEnableFlag && !isChroma) { | |
| if ((isIntra \|\| IbcCuFlag)&& !DtSplitFlag && !IstTuFlag) { | |
| est_tu_flag | ae(v) |
| } | |
| } | |
| … | |
| } | |

FIG. 7

| Coding unit definition | Descriptor |
|---|---|
| coding_unit(x0, y0, width, height, mode, component) { | |
| … | |
| if (IbcCuFlag) { | |
| ism_flag | ae(v) |
| cbvp_index | ae(v) |
| } | |
| … | |
| } | |

FIG. 8

SYSTEMS AND METHODS FOR TRANSFORMATION BASED ON AN INTRA BLOCK COPY (IBC) MODE

CROSS-REFERENCE TO RELATED APPLICATIONS

This application is a Continuation of International Application No. PCT/CN2021/135868, filed on Dec. 6, 2021, which claims priority to Chinese Patent Application No. 202011419551.3, filed on Dec. 6, 2020, the contents of each of which are incorporated herein by reference.

TECHNICAL FIELD

This present specification relates to the field of video data processing, and in particular, to systems and methods for transformation based on an IBC mode.

BACKGROUND

In a traditional IBC-based transformation mode, in response to determining that a block to be predicted (also referred to as a current block or a first block in the present disclosure) satisfies an implicit skip transformation condition, a discrete cosine transformation mode and an implicit skip transformation mode may be performed on rows and columns of the block to be predicted, and a transformation mode with the smallest cost may be selected as an optimal transformation mode for the block to be predicted. In response to determining that the block to be predict does not satisfy the implicit skip transformation condition, a discrete cosine transformation mode may be performed on rows and columns of the block to be predict. Accordingly, only the discrete cosine transformation mode and the implicit skip transformation mode are considered in the traditional IBC-based transformation mode, which may affect an encoding compression rate. Thus, it is desirable to provide systems and methods for transformation based on the IBC mode with a relatively high encoding compression rate.

SUMMARY

According to another aspect of the present disclosure, a method for transformation based on an intra block copy (IBC) mode may be implemented on a computing device having at least one processor and at least one storage device. The method may include obtaining a set of candidate transformation results by performing a set of candidate transformation modes on a first block in an image. The set of candidate transformation modes may include at least one of a first transformation mode, a secondary transformation mode, or a sub-block transformation mode. The method may include determining a target transformation mode for the first block based on the set of candidate transformation results.

In some embodiments, the method may include determining whether the first block satisfies a sub-block transformation condition. The method may include, in response to determining that the first block satisfies the sub-block transformation condition, selecting the target transformation mode from a plurality of candidate sub-block transformation modes.

In some embodiments, the method may include determining a plurality of second blocks based on the first block. The method may include determining the target transformation mode by comparing a plurality of costs corresponding to the plurality of candidate sub-block transformation modes of the plurality of second blocks.

In some embodiments, the method may include dividing the first block into a plurality of sub-blocks based on a division mode. The method may include designating the plurality of sub-blocks as the plurality of second blocks.

In some embodiments, the method may include determining whether the first block satisfies a secondary transformation condition. The method may include, in response to determining that the first block satisfies the secondary transformation condition, performing a first candidate transformation mode on the first block to generate a transformed first block. The first candidate transformation mode may include a discrete cosine transform. The method may include performing a second candidate transformation mode on coefficients of the transformed first block.

In some embodiments, the method may include determining whether a block vector of the first block in a horizontal direction is 0. The method may include, in response to determining that the block vector of the first block in the horizontal direction is not 0, performing the second candidate transformation mode on the coefficients of the transformed first block in the horizontal direction.

In some embodiments, the method may include determining whether a block vector of the first block in a vertical direction is 0. The method may include, in response to determining that the block vector of the first block in the vertical direction is not 0, performing the second candidate transformation mode on the coefficients of the transformed first block in the vertical direction.

In some embodiments, the method may include determining the target transformation mode by comparing a first cost corresponding to the first candidate transformation mode and a second cost corresponding to the second candidate transformation mode.

In some embodiments, the method may include designating one of the first candidate transformation mode and the second candidate transformation mode whose cost is smaller among the first cost and the second cost as the target transformation mode.

In some embodiments, the method may include, in response to determining that the first block satisfies an implicit selection of transform skip (ISTS), determining that the set of candidate transformation modes include an ISTS.

In some embodiments, the method may include, in response to determining that the first block does not satisfy an ISTS condition, determining that the set of candidate transformation modes include at least one of the DCTi or the DSTi, wherein $1 \leq i \leq 8$.

According to another aspect of the present disclosure, a method for transformation based on an intra block copy (IBC) mode may be implemented on a computing device having at least one processor and at least one storage device. The method may include determining a residual block based on the first block. The method may include obtaining a code stream of the first block by encoding the residual block.

In some embodiments, the code stream may include a syntax element. The syntax elements may include a label of a skip residual mode. The label may indicate whether the skip residual mode is performed on the first block.

According to another aspect of the present disclosure, a system for transformation based on an intra block copy (IBC) mode may include at least one storage device configured to store a set of program instructions, and at least one processor coupled to the at least one storage device. The at least one processor may be configured to execute the program instructions, which may cause the system to perform a method. The method may include obtaining a set of candidate transformation results by performing a set of candidate transformation modes on a first block in an image. The set of candidate transformation modes may include at least one of a first transformation mode, a secondary transformation mode, or a sub-block transformation mode. The method may include determining a target transformation mode for the first block based on the set of candidate transformation results.

According to another aspect of the present disclosure, a system for transformation based on an intra block copy (IBC) mode may include at least one storage device configured to store a set of program instructions, and at least one processor coupled to the at least one storage device. The at least one processor may be configured to execute the program instructions, which may cause the system to perform a method. The method may include determining a residual block based on the first block. The method may include obtaining a code stream of the first block by encoding the residual block.

According to still another aspect of the present disclosure, a non-transitory computer readable medium may include at least one set of program instructions. When executed by at least one processor of a computing device, the at least one set of program instructions may cause the at least one processor to effectuate a method. The method may include obtaining a set of candidate transformation results by performing a set of candidate transformation modes on a first block in an image. The set of candidate transformation modes may include at least one of a first transformation mode, a secondary transformation mode, or a sub-block transformation mode. The method may include determining a target transformation mode for the first block based on the set of candidate transformation results.

According to still another aspect of the present disclosure, a non-transitory computer readable medium may include at least one set of program instructions. When executed by at least one processor of a computing device, the at least one set of program instructions may cause the at least one processor to effectuate a method. The method may include determining a residual block based on the first block. The method may include obtaining a code stream of the first block by encoding the residual block.

According to still aspect of the present disclosure, a system for transformation based on an intra block copy (IBC) mode may include a transformation result determination module and a transformation mode determination module. The transformation result determination module may be configured to obtain a set of candidate transformation results by performing a set of candidate transformation modes on a first block in an image. The set of candidate transformation modes may include at least one of a first transformation mode, a secondary transformation mode, or a sub-block transformation mode. The transformation mode determination module may be configured to determine a target transformation mode for the first block based on the set of candidate transformation results.

According to still aspect of the present disclosure, a system for transformation based on an intra block copy (IBC) mode may include a residual block determination module and an encoding module. The residual block determination module may be configured to determine a residual block based on the first block. The encoding module may be configured to obtain a code stream of the first block by encoding the residual block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a table illustrating an exemplary coding unit definition table according to some embodiments of the present disclosure;

FIG. 7 is a table illustrating an exemplary coding unit definition table according to some embodiments of the present disclosure;

FIG. 8 is a table illustrating an exemplary coding unit definition table according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It should be understood that the "unit" used in this disclosure refers to a basic unit for image processing or a specific position in an image, and also refers to an image area including both a luminance component and a chrominance component. In addition, "block" refers to an image area including a specific component in the luminance component and the chrominance component (i.e., Cb and Cr). Terms, such as "unit", "block," "partition," and "area" may be used interchangeably. Additionally, in this disclosure, the unit may be used as a compilation unit, a prediction unit, or a transformation unit. The image may be used as a frame, and these terms may be used interchangeably. In some embodiments, these terms may be replaced by other expressions.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Figure 1:
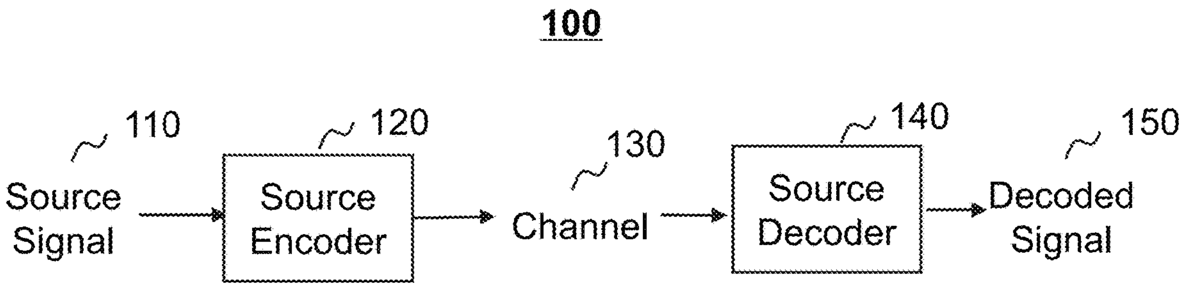
FIG. 1 is a schematic diagram illustrating an exemplary process for video processing according to some embodiments of the present disclosure.

FIG. 1 is a schematic diagram illustrating an exemplary process for video processing according to some embodiments of the present disclosure.

In some embodiments, a transformation system 100 based on an IBC mode may be applied to a digital image/video compression system, such as an aerial TV broadcasting system, a cable TV transmission system, a satellite TV transmission system, an Internet video transmission system, a digital video stored in media, or the like. As used herein, an image/video compression refers to a process of reducing the amount of data required to present the digital images/videos. The purpose of the image/video compression may be to reduce redundant information in image/video data so as to store and transmit data effectively.

As shown in FIG. 1, the transformation system 100 may include a source signal 110, a source encoder 120, a channel 130, a source decoder 140, and a decoded signal 150.

In some embodiments, the source signal 110 may include source image data. In some embodiments, the source image data may refer to uncompressed original image data that has not been processed by a digital image editing and compression application. The source image data may include one or more source images, a source video, etc. A source image may include a video tape, a laser disk, a dynamic script, a digital image file, or the like. The source video may refer to uncompressed dynamic images, and a storage format of the source video may include a digital video format.

In some embodiments, the source encoder 120 may refer to a signal compression standard completed by software and/or hardware applications. The source encoder 120 may be configured to compress the source signal 110 (e.g., a source image, a source video) at a coding end to obtain an encoded source signal.

In some embodiments, the transformation system 100 may further include a channel encoder. The channel encoder may refer to a device or program that may further encode an encoded source signal before channel transmission at the coding end. The channel encoder may be configured to perform an error correction.

In some embodiments, the channel 130 may transmit or store encoded image data. The channel 130 may include a wireless channel, a wired channel, or a frequency band. The channel 130 may include a twisted pair, a cable, an optical fiber, or a medium that may propagate electromagnetic waves.

In some embodiments, the encoded image data may be stored in a storage device (e.g., a hard disk), and the encoded image data may be read from the storage device during a subsequent decoding processing process.

In some embodiments, the transformation system 100 may include a channel decoder. The channel decoder may be configured at a decoding end to detect and correct an error in data transmission. The coding end and the decoding end may refer to programs or software used for data compression (e.g., video compression). For example, the coding end and the decoding end may include a video compressor.

In some embodiments, the source decoder 140 may refer to a signal compression standard completed by software or hardware applications. The source decoder 140 may be configured to generate an approximation of the source signal (e.g., a source image or a source video) in a decoding end for playback. For example, the source decoder 140 may be configured to decode the encoded signal source.

In some embodiments, the decoded signal 150 may refer to data reconstructed from the source signal 110 after being encoded and decoded. The decoded signal 150 may include image data after being compressed and decompressed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
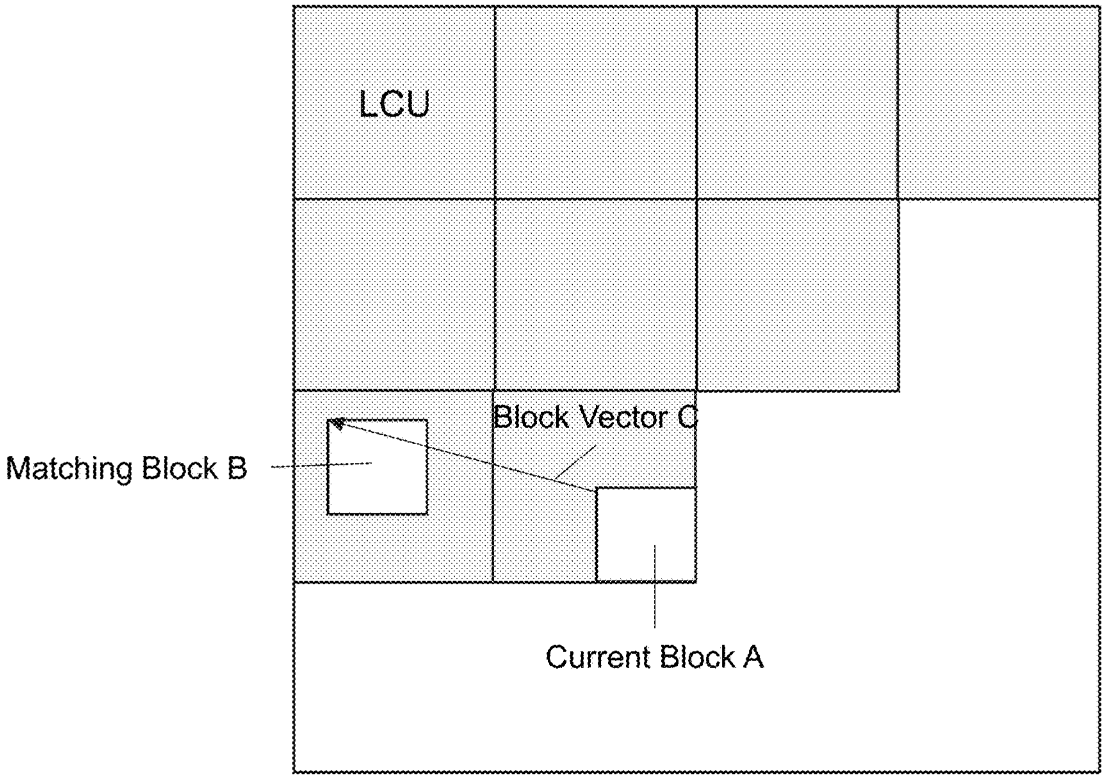
FIG. 2 is a schematic diagram illustrating an exemplary IBC mode according to some embodiments of the present disclosure.

FIG. 2 is a schematic diagram illustrating an exemplary IBC mode according to some embodiments of the present disclosure.

The IBC mode may be a block-level coding mode in an intra-frame prediction technique. Using the IBC mode, a matching block for each coding unit (CU) may be determined using a block matching technique at the coding end, and a block vector (BV) may be determined based on the matching block. The matching block may refer to a block that is the same as or similar to a current block (i.e., a current CU) (also referred to as a first block in the present disclosure). The block vector may represent a position relationship between the current block and the matching block corresponding to the current block. For example, the block vector may be a position offset vector between the current block and the matching block corresponding to the current block.

As shown in FIG. 2, in the IBC mode, an image frame to be predicted may be divided into a plurality of largest coding units (LCU). Each LCU may be divided into a plurality of CUs. Sizes of the plurality of CUs may be the same or different. A block vector C between a current block A and a matching block B may be obtained based on a position of the current block A and a position of the matching block B. A pixel value of the matching block may be determined as a predicted value of the current block.

In some embodiments, the IBC based transformation mode disclosed in the present disclosure may be applied to a screen content scene (SCC). The SCC may refer to a screen content generated by a computer. In some embodiments, the IBC based transformation mode disclosed in the present disclosure may be applied to mixed scenes of screen content and natural images. The natural image may refer to an image captured by a camera.

Figure 3A:
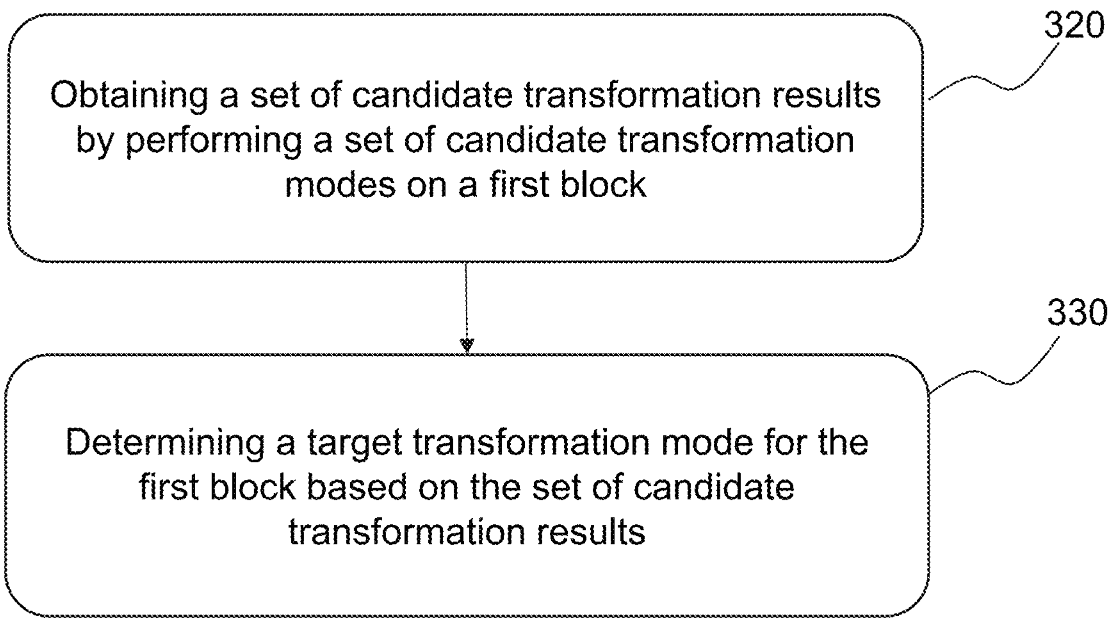
FIG. 3A is a flowchart illustrating an exemplary process for transformation based on an IBC mode according to some embodiments of the present disclosure.

FIG. 3 is a flowchart illustrating an exemplary process for transformation based on an IBC mode according to some embodiments of the present disclosure.

In 320, a set of candidate transformation results may be obtained by performing a set of candidate transformation modes on the first block. The set of candidate transformation modes may include at least one of a first transformation mode, a secondary transformation mode, or a sub-block transformation mode. In some embodiments, operation 320 may be performed by a transformation result determination module 520.

As used herein, a first block may refer to a block to be predicted (also referred to as a current block in the present disclosure). In some embodiments, the first block may be a current block to be predicted in an inter prediction process. In some embodiments, the transformation result determination module 520 may determine whether the first block satisfies a sub-block transformation condition. In response to determining that the first block satisfies the sub-block transformation condition, the transformation result determination module 520 may select the target transformation mode from a plurality of candidate sub-block transformation modes. In some embodiments, the candidate sub-block transformation modes may include a discrete cosine transform, an implicit selection of transform skip (ISTS), or the like.

In some embodiments, the transformation result determination module 520 may determine a plurality of second blocks based on the first block. The transformation result determination module 520 may determine the target transformation mode by comparing a plurality of costs corresponding to the plurality of candidate sub-block transformation modes of the plurality of second blocks. The transformation result determination module 520 may select a candidate sub-block transformation mode whose cost is smallest among the plurality of costs corresponding to the plurality of candidate sub-block transformation modes as the target transformation mode. In some embodiments, the transformation result determination module 520 may divide the first block into a plurality of sub-blocks based on a division mode. The transformation result determination module 520 may designate the plurality of sub-blocks as the plurality of second blocks. In some embodiments, the transformation result determination module 520 may determine a residual block based on the first block. The one or more second blocks may be determined based on the residual block.

In some embodiments, the residual block may be determined as the second block. In some embodiments, a sub-block of the residual block may be determined as the second block. For example, the residual block may be divided into one or more sub-blocks based on a division mode. The one or more sub-blocks may be designated as the one or more second blocks.

In some embodiments, the division mode may include a horizontal division mode or a vertical division mode. For example, the residual block may be divided into two sub-blocks based on a sub-block transform (SBT) mode. The residual of a first sub-block may be 0, and the residual of the second sub-block may not be 0 (i.e., a non-zero residual sub-block). The non-zero residual sub-block may be determined as the second block.

Figure 4:
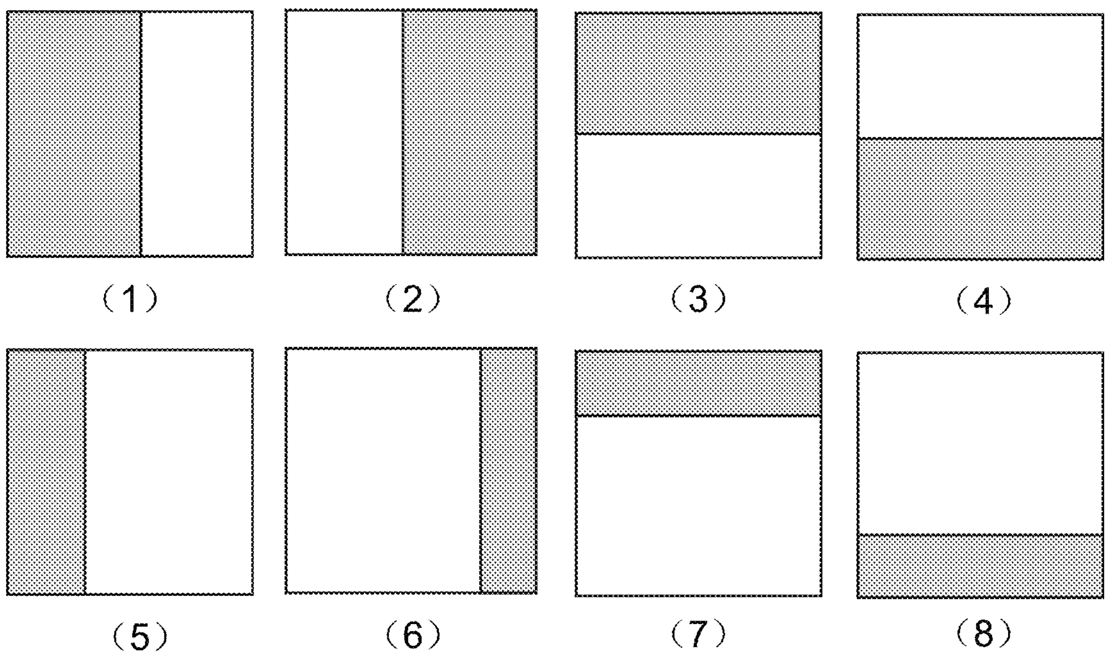
FIG. 4 is a schematic diagram illustrating an exemplary residual sub-block according to some embodiments of the present disclosure.

As shown in FIG. 4, there are eight types of non-zero residual sub-blocks (e.g., the residual of the non-zero residual sub-blocks is ½ or ¼ of a first block). The size and/or the position of the eight types of non-zero residual sub-blocks may be different. A gray area in the first block may represent a non-zero residual sub-block, and a white area in the first block may represent residual zero. The horizontal transformation mode and/or the vertical transformation mode of a non-zero residual sub-block may be determined based on the size and/or the position of the non-zero residual sub-block. The horizontal transformation mode and/or the vertical transformation mode may include a discrete cosine transform 8 ($DCT_8$) mode, a $DST_7$ mode, or the like.

Table 1 shows an exemplary selection of an IBC transformation mode. In some embodiments, the sub-block transformation mode may be expressed by modifying a text corresponding to a coding unit definition in a compression standard. For example, a reference video standard document of a second stage of a AVS3 compression standard may include coding unit definitions and corresponding descriptors. According to the reference video standard document, the modification of syntax elements in the AVS3 compression standard may be shown in a coding unit definition as illustrated in FIG. 6.

TABLE 1

An exemplary selection of IBC transformation mode

| Est Flag | Implicitly Derived Index | SBT Flag | Transformation Mode |
|---|---|---|---|
| 1 | — | — | EST |
| 0 | 0 | — | ISTS |
| | 1 | 0 | ($DCT_2$, $DCT_2$) |
| | | 1 | SBT |

In some embodiments, the transformation result determination module 520 may determine whether the first block satisfies a secondary transformation condition. In response to determining that the first block satisfies the secondary transformation condition, the transformation result determination module 520 may perform a first candidate transformation mode on the first block to generate a transformed first block. The first candidate transformation mode may include a discrete cosine transform. The transformation result determination module 520 may perform a second candidate transformation mode on coefficients of the transformed first block. For example, the transformation result determination module 520 may determine whether a block vector of the first block in a horizontal direction is 0. In response to determining that the block vector of the first block in the horizontal direction is not 0, the transformation result determination module 520 may perform the second candidate transformation mode on the coefficients of the transformed first block in the horizontal direction. As another example, the transformation result determination module 520 may determine whether a block vector of the first block in a vertical direction is 0. In response to determining that the block vector of the first block in the vertical direction is not 0, the transformation result determination module 520 may perform the second candidate transformation mode on the coefficients of the transformed first block in the vertical direction. More descriptions for performing the secondary transformation mode may be found elsewhere in the present disclosure (e.g., operation 330 in FIG. 3 and descriptions thereof).

In 330, a target transformation mode of the first block may be determined based on the set of candidate transformation results. In some embodiments, operation 330 may be performed by a transformation mode determination module 530.

In some embodiments, the target transformation mode may have a relatively small cost (e.g., smaller than a cost threshold). The cost may be related to an image distortion degree and/or a bit rate. For example, the lower the image distortion degree, the smaller the code stream (e.g., an encoded bit size), and the lower the cost. The cost may be determined based on information of an encoding mode of an image frame, such as a measurement of a residual, an image distortion, or the like. For example, the cost may be expressed as Equation (1):

$$\text{cost}=\Delta D+\lambda R \quad (1),$$

where ΔD refers to a residual of a first block, which is a measurement of image distortion; λ refers to a Lagrange multiplier (i.e., a real number coefficient); R refers to a size of a code stream. In some embodiments, the residual ΔD may include a sum of absolute difference (SAD), a sum of squared error (SSE), or the like. It should be noted that the cost may also be expressed by other information of the encoding mode, which is not limited here.

In some embodiments, the candidate transformation result corresponding to a candidate transformation mode may include a cost corresponding to the candidate transformation mode. In some embodiments, the transformation mode determination module 530 may determine the cost corresponding to each candidate transformation mode of the set of candidate transformation modes. The transformation mode determination module 530 may select a candidate transformation mode with the smallest cost as the target transformation mode.

In some embodiments, the set of candidate transformation modes may introduce an enhanced secondary transform (EST) in an existing IBC based transformation mode. In some embodiments, only a discrete cosine transformation mode and an implicit skip transformation mode may be considered in an IBC based transformation mode, and a transformation mode with the smallest cost may be selected as an optimal transformation mode (i.e., the target transformation mode) to perform an encoding operation on the first block. The transformation core may be relatively few, which may affect the coding compression rate of the IBC based transformation mode. According to some embodiments of the present disclosure, a secondary transformation mode and/or a sub-block transformation mode may be introduced in the IBC based transformation mode, more transformation cores may be introduced, the IBC based transformation modes may be enriched, which may improve the encoding compression rate of the IBC based transformation mode. A transformation mode with the smallest cost may be selected as the target transformation mode (e.g., an optimal transformation mode) for the first block. The set of candidate transformation results may include costs of the set of candidate transformation modes. Specifically, the transformation mode determination module 530 may determine whether the first block satisfies a secondary transformation condition. The secondary transformation condition may be satisfied that a first candidate transformation mode has been performed on the first block, and the first candidate transformation mode is not an implicit transformation mode. In some embodiments, after the first candidate transformation mode is performed on the first block, a second candidate transformation mode may be performed on a 4×4 transformation block in an upper left corner of a transformed first block.

If the first block satisfies a secondary transformation condition, a second candidate transformation mode may be performed on the first block. For example, after a transformed first block is obtained by performing the first candidate transformation on the first block, the second candidate transformation mode may be performed on coefficients of the transformed first block. After the second candidate transformation mode is performed on the first block, the cost of the first candidate transformation mode and the cost of the second candidate transformation mode may be obtained, and the cost of the first candidate transformation mode and the cost of the second candidate transformation mode may be compared. The transformation mode determination module 530 may determine a transformation mode with the smallest cost among the first candidate transformation mode and the second candidate transformation mode as a target transformation mode of the first block based on a comparison result. If the first block does not satisfy the secondary transformation condition, the horizontal direction and the vertical direction of the first block may be transformed based on the set of candidate transformation modes and the sub-block transformation mode of the each of the one or more second blocks, and a transformation mode with the smallest cost may be determined as the target transformation mode for the first block.

In some embodiments, when the second candidate transformation mode is performed on the first block, the transformation mode determination module 530 may determine whether a horizontal transformation mode or a vertical transformation mode is performed on the first block based on a motion vector. For example, if a BV[x] is not 0, a row transformation mode (e.g., the horizontal transformation mode) may be performed on the first block. If BV[y] is not 0, a column transformation mode (e.g., the vertical transformation mode) may be performed on the first block. If both BV[x] and BV[y] are not 0, the horizontal transformation mode and the vertical transformation mode may both be performed on the first block.

Table 2 shows an exemplary selection of an IBC transformation mode. The secondary transformation may be expressed by modifying a text corresponding to a coding unit definition in a compression standard. For example, a reference video standard document of a second stage of a AVS3 compression standard includes transform block definitions and corresponding descriptors, according to the reference video standard document, the modification of syntax elements in the AVS3 compression standard may be shown in a coding unit definition as illustrated in FIG. 7. In the existing AVS3 compression standard, the conditions for a syntax "est_tu_flag" of the secondary transformation mode may be only valid in an intra prediction mode (i.e., "isIntra"). In the present disclosure, the conditions for the syntax "est_tu_flag" of the secondary transformation mode may be added to the conditions for the syntax of the secondary transformation mode.

TABLE 2

An exemplary selection of IBC transformation mode

| Est flag | Implicitly derived index | Transformation mode |
|---|---|---|
| 1 | — | EST |
| 0 | 0 | ISTS |
| | 1 | ($DCT_2$, $DCT_2$) |

In some embodiments, the set of candidate transformation modes may include a discrete cosine transformation i ($DCT_i$) mode, wherein 1≤i≤8. For example, a candidate transformation mode may include a $DCT_5$ mode. The DCT mode may be used in data compression or image compression. The DCT mode may be a transformation mode related to the Fourier transform. After an image is transformed based on the DCT mode, basic information of the image may be in the upper left corner of the image. Therefore, the image may be restored after data associated with other parts of the image (i.e., the parts except the upper left corner of the image) is removed, so the image may be compressed and stored within an acceptable error range.

Specifically, if the first block satisfies the secondary transformation condition, a first candidate transformation mode (e.g., a discrete cosine transformation mode) may be performed on the first block. In some embodiments, the discrete cosine transformation mode may be performed on both of the horizontal direction and the vertical direction of the first block.

In some embodiments, the discrete cosine transformation mode may include a $DCT_2$ mode. That is, the $DCT_2$ mode may be performed on the horizontal direction and the vertical direction of the first block. Take the discrete cosine transformation mode as the $DCT_2$ mode as an example, a second candidate transformation mode may then be performed on coefficients of the first block after the $DCT_2$ mode is performed on the first block, and the second transformation matrix may be determined based on the discrete cosine transformation mode. That is, a transformed first block may be obtained by performing the first candidate transformation mode (e.g., the $DCT_2$ mode) on the first block, and the second candidate transformation mode may then be performed on coefficients of the transformed first block, to complete the secondary transformation operation for the first block.

In some embodiments, the cost of the discrete cosine transformation mode and the cost of the second candidate transformation mode may be compared. Specifically, the cost of the discrete cosine transformation mode (e.g., the $DCT_2$ mode) performed on the first block and the cost of the second candidate transformation mode performed on the coefficients of the first block after the first candidate transformation mode is performed on the first block using the second transformation matrix may be compared. The transformation mode with the smallest cost may be selected as the target transformation mode for the first block.

In some embodiments, the transformation mode with the smallest cost may be selected as the target transformation mode for the first block. For example, if the cost of the discrete cosine transformation mode (e.g., the $DCT_2$ mode) performed on the first block is smaller than the cost of the second candidate transformation mode performed on the coefficients of the first block after the $DCT_2$ mode is performed on the first block using the second transformation matrix, the discrete cosine transformation mode may be selected as the target transformation mode for the first block. That is, the $DCT_2$ mode may be determined as the target transformation mode for the first block.

If the cost of the second candidate transformation mode performed on the coefficients of the first block after the $DCT_2$ mode is performed on the first block is smaller than the cost of the discrete cosine transformation mode (e.g., the $DCT_2$ mode) performed on the first block, the second candidate transformation mode may be selected as the target transformation mode for the first block.

In some embodiments, if the first block does not satisfy the secondary transformation condition, only one discrete cosine transformation mode may be performed on the horizontal direction and the vertical direction of the first block. In some embodiments, the discrete cosine transformation mode may include the $DCT_2$ mode. In some embodiments, if the first block does not satisfy the secondary transformation condition, a determination may be made as whether the first block satisfies an implicit skip transformation condition.

In some embodiments, the set of candidate transformation modes may include a discrete sine transform i ($DST_i$) mode, wherein 1≤i≤8. For example, the set of candidate transformation modes may include a $DCT_5$ mode.

In some embodiments, in response to determining that the each of the one or more second blocks satisfies an implicit selection of transform skip (ISTS) condition, the transformation mode determination module 530 may determine that the set of candidate transformation modes include an ISTS. The ISTS refers to a process of shifting and scaling a residual without transforming the residual, and then performing operations such as quantization and entropy coding on the residual. Specifically, in response to determining that the each of the one or more second blocks satisfies the ISTS condition, the implicit skip transformation mode and the discrete cosine transformation mode may be performed on the first block.

In some embodiments, the ISTS condition may be associated with attributes of the residual block, such as a size of the residual block. For example, the ISTS condition may be satisfied that a size of the residual block is ½ of the first block.

In some embodiments, in response to determining that the each of the one or more second blocks does not satisfy the ISTS condition, the transformation mode determination module 530 may determine that the set of candidate transformation modes includes a specified transformation mode. In some embodiments, the specified transformation mode may include a $DCT_i$ mode, wherein 1≤i≤8. For example, the specified transformation mode may include a $DCT_1$ mode. As another example, the specified transformation mode may include a $DCT_8$ mode. In some embodiments, the specified transformation mode may include a $DST_i$ mode, wherein 1≤i≤8. For example, the specified transformation mode may include a $DST_1$ mode. As another example, the specified transformation mode may include a $DST_8$ mode.

In some embodiments, the cost of the ISTS transformation mode and the cost of the discrete cosine transformation mode may be compared. For example, the cost of the ISTS transformation mode may be compared with the cost of the $DCT_2$ transformation mode.

In some embodiments, the transformation mode with the smallest cost may be selected as the target transformation mode for the first block. Specifically, if the cost of the ISTS transformation mode is less than the cost of the $DCT_2$ mode performed on the horizontal and vertical directions of the first block, the ISTS transformation mode may be determined as the target transformation mode for the first block. If the cost of the $DCT_2$ mode performed on the horizontal and vertical directions of the first block is smaller than the cost of the ISTS transformation mode, the $DCT_2$ mode may be determined as the target transformation mode for the first block.

Accordingly, the secondary transformation mode may be introduced in the IBC based transformation mode as disclosed in the present disclosure. If the current block satisfies the secondary transformation condition, the secondary transformation mode may be performed on the first block. The cost of the first candidate transformation mode and the cost of the second candidate transformation mode may be compared. More transformation cores may be introduced. Since different transformation cores have different energy compaction abilities for different content, a transformation mode with a smaller cost may be obtained by introducing more transformation cores, which may improve the encoding compression rate of the IBC based transformation mode.

In some embodiments, a determination may be made as whether the first block satisfies a sub-block transformation (SBT) condition. The SBT may refer to a transformation mode in an inter-frame prediction mode. In the SBT mode, a residual may be divided into two sub-blocks. The residual of a first sub-block is zero by default, and the residual of the second sub-block is not zero by default. The transformation operation may only be performed on the sub-block whose residual is not zero (i.e., a non-zero residual sub-block). There are eight cases for the size and the position of the non-zero residual sub-block (the information may be transmitted in the code stream), the transformation modes (the horizontal and vertical transformation modes) (e.g., the $DCT_8$ mode, the $DST_7$ mode) for the non-zero residual sub-block may be selected based on the position of the non-zero residual sub-block.

In some embodiments, the SBT mode may be performed on the first block. For example, the sub-blocks of the first block may be transformed based on the SBT mode.

In some embodiments, the cost of the implicit skip transformation mode, the cost of the discrete cosine transformation mode, and the cost of the SBT mode may be compared. For example, the transformation mode with the smallest cost may be selected as the target transformation mode for the first block based on a comparison result.

In some embodiments, the transformation mode with the smallest cost may be selected as the target transformation mode for the first block. Specifically, if the cost of the implicit skip transformation mode is less than the cost of the discrete cosine transformation mode and the cost of the SBT mode, the implicit skip transformation mode may be determined as the target transformation mode for the first block. If the cost of the discrete cosine transformation mode is less than the cost of the implicit skip transformation mode and the cost of the SBT mode, the discrete cosine transformation mode may be determined as the target transformation mode for the first block. If the cost of the SBT mode is less than the cost of the discrete cosine transformation mode and the cost of implicit skip transformation mode, the SBT mode may be determined as the target transformation mode for the first block.

In some embodiments, the discrete cosine transformation mode may be performed on the first block only once. Specifically, if the first block does not satisfy the implicit skip transformation condition, the discrete cosine transformation mode may be performed on the horizontal and vertical directions of the first block only once. Then the cost of the discrete cosine transformation mode may be compared with the cost of the SBT mode.

According to some embodiments of the present disclosure, the SBT mode belonged to the inter prediction mode may be introduced in the IBC based transformation mode, which may improve the encoding compression rate of the IBC based transformation mode. After the transformation mode with the smallest cost is selected as the target transformation mode, the first block may be encoded based on the target transformation mode to obtain the code stream of the first block. The code stream may include syntax elements, and the syntax elements may include the target transformation mode. Specifically, the syntax elements may indicate various information used in the encoding process. The syntax elements may include the transformation mode used in the encoding process, which may facilitate the decoding end to decode the code stream. For example, if the target transformation mode is the sub-block transformation mode, syntax elements corresponding to the sub-block transformation mode may be encoded into the code stream. If the target transformation mode is the secondary transformation mode, syntax elements corresponding to the secondary transformation mode may be encoded into the code stream.

Figure 3B:
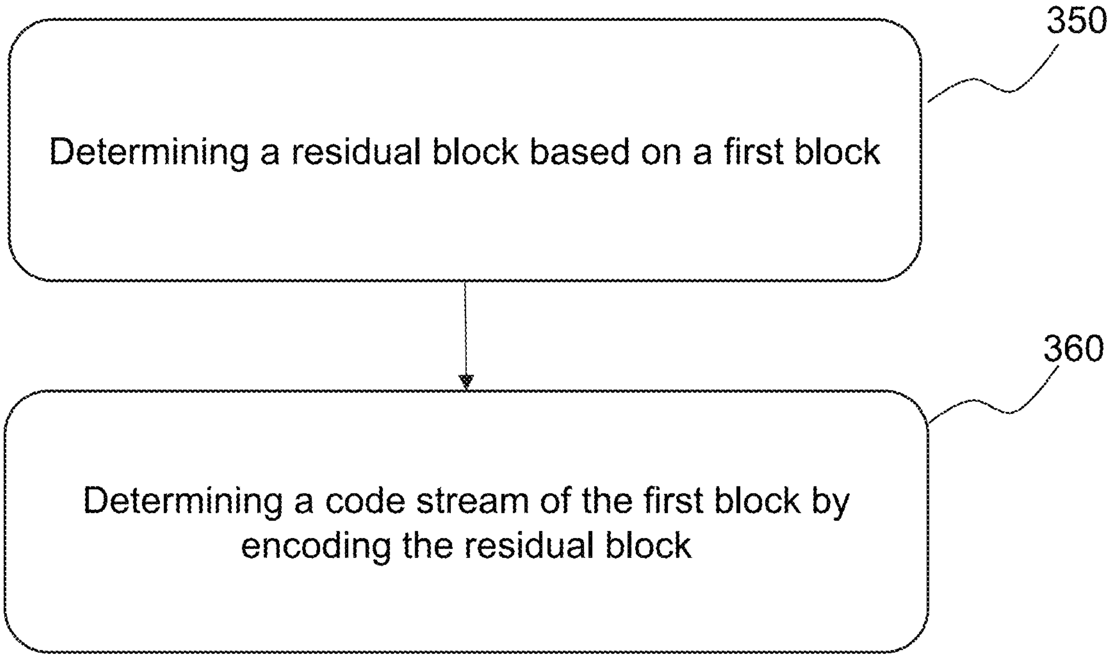
FIG. 3B is a flowchart illustrating an exemplary process for obtaining a code stream of a first block according to some embodiments of the present disclosure.

FIG. 3B is a flowchart illustrating an exemplary process for obtaining a code stream of a first block according to some embodiments of the present disclosure.

In 350, a residual block may be determined based on a first block in an image. In some embodiments, operation 350 may be performed by a residual block determination module 510.

In some embodiments, a predicted value of the first block may be obtained in the inter prediction process. A residual corresponding to the first block may be determined based on a difference between an actual value (i.e., an actual pixel value) of the first block and the predicted value of the first block. The residual of a block in the image may be used as a residual block to be transformed based on the IBC mode. In video coding, a transformation operation (e.g., a transform coding process) may be performed after the prediction process for the first block.

In some embodiments, in response to determining that a residual processing mode satisfies a first condition, the residual block may be determined based on the first block. In some embodiments, the residual processing mode may satisfy the first condition in response to determining that the residual block can be determined based on the first block. In some embodiments, the residual processing mode may satisfy the first condition in response to determining that a transformation operation has been performed on the residual. In some embodiments, the residual processing mode may satisfy the first condition in response to determining that a type of a transformation operation performed on the residual satisfies a condition. For example, the condition may be satisfied that the type of the transformation operation does not include an implicit transformation mode, such as an implicit selection of transform (IST) mode, a horizontal and vertical transformation $DST_7$ mode.

In 360, a code stream of the first block may be determined by encoding the residual block. In some embodiments, operation 360 may be performed by the encoding module 540.

In some embodiments, the residual block may be encoded to obtain the code stream of the first block. The code stream may include syntax elements. The syntax elements may include various information used in encoding of the residual block. For example, the syntax elements may include the transformation mode used in a coding end during encoding, which may be used for a decoding end to decode the code stream.

In some embodiments, in response to determining that the residual processing mode satisfies a second condition, the first block may be encoded based on the residual block. For example, in response to determining that the residual processing mode satisfies the second condition, the code stream may be determined by encoding the residual block based on the transformation mode. In some embodiments, in response to determining that the residual processing mode satisfies the second condition, the first block may be encoded based on a predicted value of the first block. The predicted value of the first block may include a reconstructed value of the first block. That is, in response to determining that the residual processing mode satisfies the second condition, no transformation, quantization, or encoding operations may be performed on the first block. Further, when the first block is decoded at the decoding end, an original value of a pixel of the first block may be obtained based on the reconstructed value and the residual value, thereby realizing an image restoration process.

In some embodiments, the second condition may be satisfied that the residual processing mode includes a label of a skip residual mode (e.g., "ism_flag"). The label may indicate whether the skip residual mode is performed on the first block. In some embodiments, the skip residual mode may be expressed by adding a label of a skip residual mode to a coding unit definition in a compression standard. As shown in FIG. 8, a reference video standard document of a second stage of a AVS3 compression standard includes coding unit definitions and corresponding descriptors, according to the reference video standard document. The syntax "ism_flag" may be added to the coding unit definition in the AVS3 compression standard. In some embodiments, when the skip residual mode is used, a loop filtering may not be performed on the first block. As shown in Table 3, if a value of "ism_flag" is 0, it may indicate that a current coding unit is transformed based on a block copy intra-frame transformation mode, and an IBC transformation mode may be used. If the value of "ism_flag" is 1, the current coding unit is transformed based on a block copy intra-frame skip residual mode, a skip residual mode may be used, and the loop filtering operation may not be performed on the first block.

TABLE 3

An exemplary selection of IBC transformation mode

| ism_flag | Implicitly Derived Index | Transformation Mode |
|---|---|---|
| 0 | 0 | ISTS |
| | 1 | $(DCT_2, DCT_2)$ |
| 1 | — | — |

In some embodiments, by introducing the residual skip mode, there are great benefits to a screen sequence, the complexity of the decoder may be reduced, and the encoding compression rate of the IBC based transformation mode may be improved.

Accordingly, by using the IBC based transformation mode disclosed in the present disclosure, more transformation cores may be introduced, thereby improving an encoding compression rate of the IBC mode. By introducing a sub-block transformation mode, transformation coefficients may be reduced by using characteristics of a transformed sub-block and a transformed block, thereby reducing the transmission of the quantized coefficients. By introducing a secondary transformation mode, transformation types of the IBC mode may be enriched, and the encoding compression rate of the IBC based transformation mode may be improved. By selecting the transformation mode with the smallest cost as the target transformation mode for the first block, the cost for coding and decoding process may be reduced, and the coding compression rate of IBC mode may be improved. By introducing the skip residual mode, the complexity of the decoder may be reduced, and the coding compression rate of the IBC based transformation mode may be improved.

Figure 5:
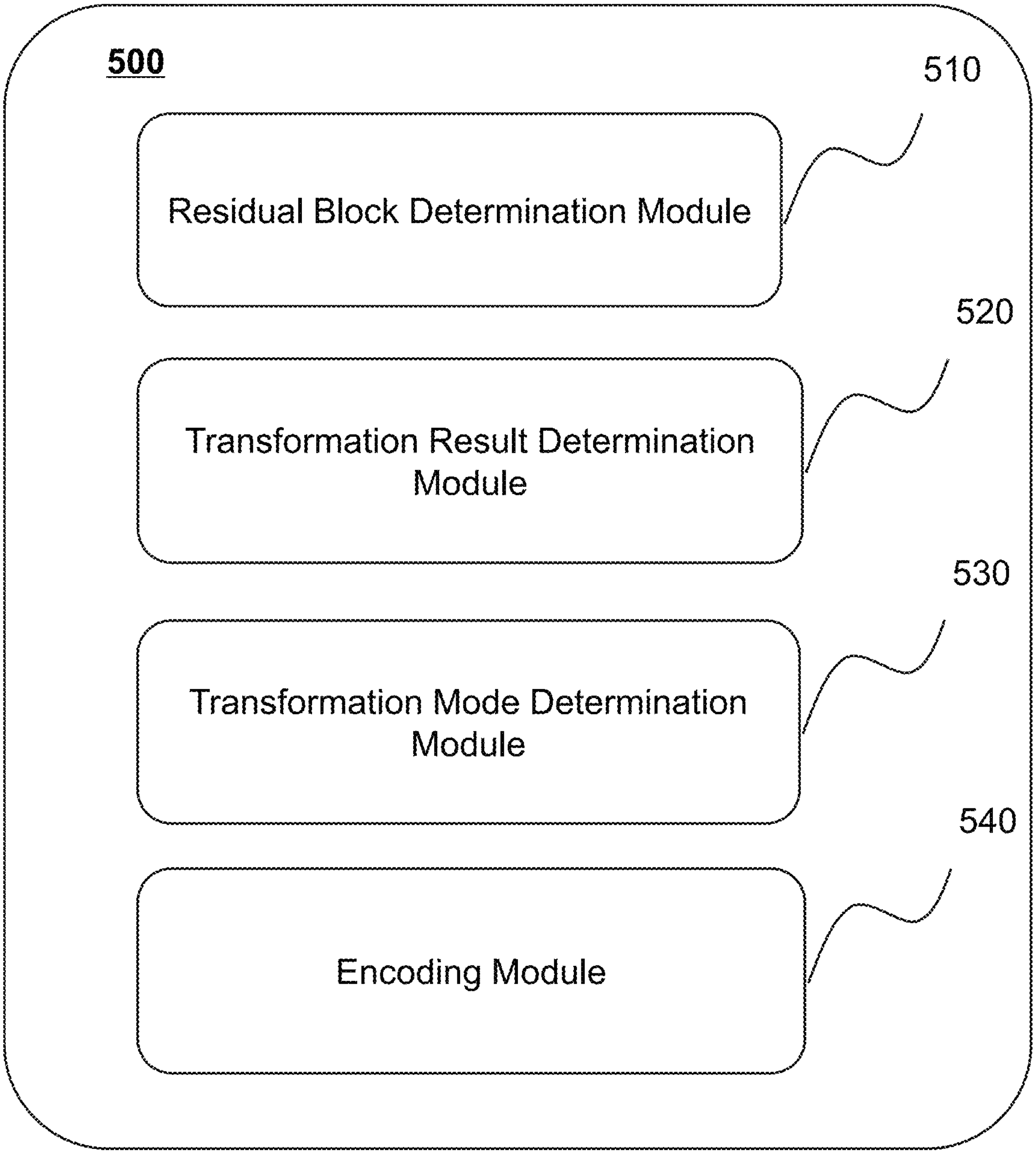
FIG. 5 is a schematic diagram illustrating an exemplary processing device of a transformation system according to some embodiments of the present disclosure.
Figure 9:
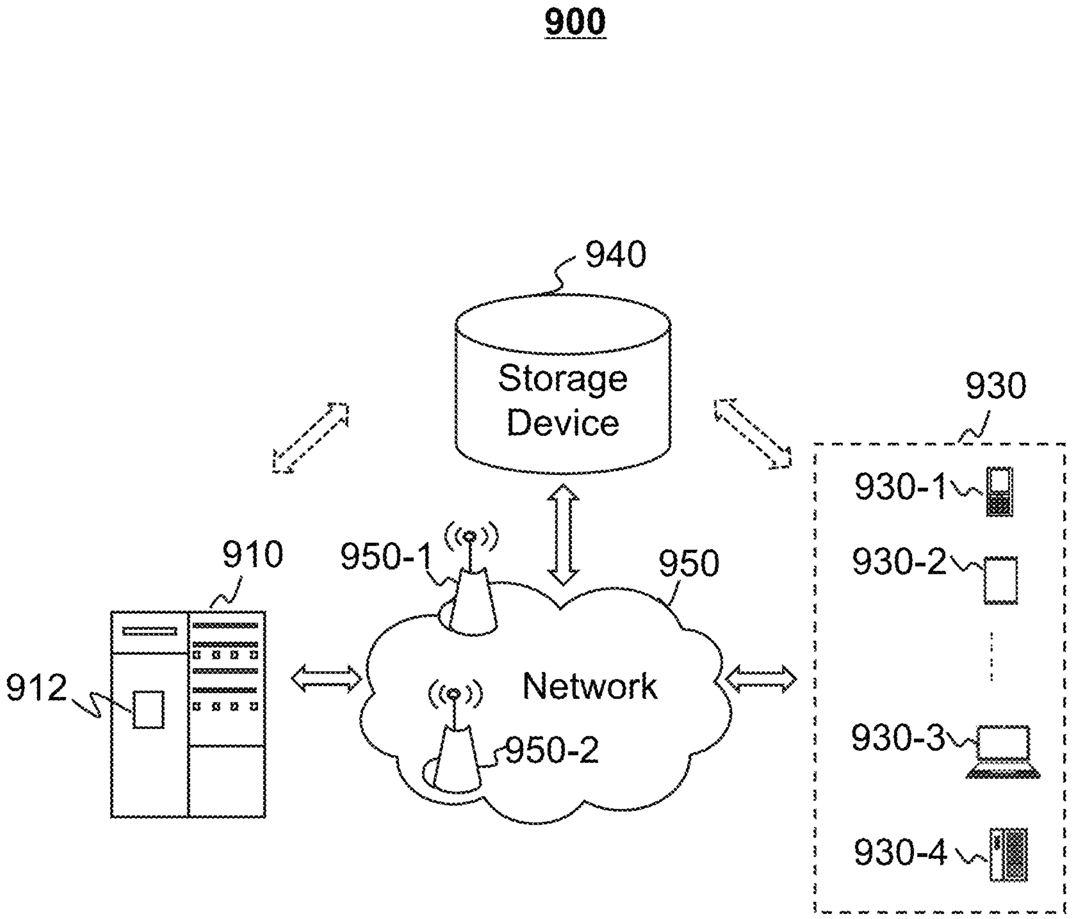
FIG. 9 is a schematic diagram illustrating an exemplary transformation system according to some embodiments of the present disclosure.

FIG. 5 is a schematic diagram illustrating an exemplary processing device 500 of the transformation system 100 according to some embodiments of the present disclosure. In some embodiments, the processing device 500 may be the same as or similar to a processing device 912 as illustrated in FIG. 9. In some embodiments, the processing device 500 may include a residual block determination module 510, a transformation result determination module 520, a transformation mode determination module 530, and an encoding module 540.

The residual block determination module 510 may be configured to determine a residual block based on a first block. In some embodiments, in response to determining that a residual processing mode satisfies a first condition, the residual block determination module 510 may determine a residual block based on a first block. In some embodiments, a residual processing mode may satisfy a first condition in response to determining that a residual block may be determined based on a first block. In some embodiments, a residual processing mode may satisfy a first condition in response to determining that a transformation operation has been performed on a residual. In some embodiments, a residual processing mode may satisfy the first condition in response to determining that a type of a transformation operation performed on a residual satisfies a condition. More descriptions for determining a residual block based on a first block may be found elsewhere in the present disclosure (e.g., operation 350 in FIG. 3 and descriptions thereof).

The transformation result determination module 520 may be configured to determine a set of candidate transformation results by performing a set of candidate transformation modes on a first block in an image. The set of candidate transformation modes may a first transformation mode, a secondary transformation mode, a sub-block transformation mode, or the like. In some embodiments, the transformation result determination module 520 may determine whether the first block satisfies a sub-block transformation condition. In response to determining that the first block satisfies the sub-block transformation condition, the transformation result determination module 520 may select the target transformation mode from a plurality of candidate sub-block transformation modes. In some embodiments, the transformation result determination module 520 may determine whether the first block satisfies a secondary transformation condition. In response to determining that the first block satisfies the secondary transformation condition, the transformation result determination module 520 may perform a first candidate transformation mode on the first block to generate a transformed first block. The transformation result determination module 520 may perform a second candidate transformation mode on coefficients of the transformed first block. More descriptions for determining a set of candidate transformation results may be found elsewhere in the present disclosure (e.g., operations 320 and 330 in FIG. 3 and descriptions thereof).

The transformation mode determination module 530 may be configured to determine a target transformation mode. For example, the transformation mode determination module 530 may perform a first candidate transformation mode on a first block to generate a transformed first block. The transformation mode determination module 530 may perform a second candidate transformation mode on the transformed first block. The transformation mode determination module 530 may determine a first cost corresponding to the first candidate transformation mode. The transformation mode determination module 530 may determine a second cost corresponding to the second candidate transformation mode. The transformation mode determination module 530 may determine the target transformation mode based on the first cost and the second cost. Merely by way of example, the transformation mode determination module 530 may designate one of the first candidate transformation mode and the second candidate transformation mode whose cost is smaller among the first cost and the second cost as the target transformation mode. More descriptions for determining a target transformation mode may be found elsewhere in the present disclosure (e.g., operation 330 in FIG. 3 and descriptions thereof).

The encoding module 540 may be configured to obtain a code stream of the first block by encoding a residual block. The code stream may include syntax elements. The syntax elements may include a label of a skip residual mode. The label may indicate whether the skip residual mode is performed on the first block. More descriptions for obtaining the code stream of the first block may be found elsewhere in the present disclosure (e.g., operation 360 in FIG. 3 and descriptions thereof).

It should be noted that the above description of the processing device 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 9 is a schematic diagram illustrating an exemplary transformation system according to some embodiments of the present disclosure. In some embodiments, a transformation system 900 may include a server 910, a terminal device 930, a storage device 940, and a network 950. The components of the transformation system 900 may be connected to each other in one or more of various ways. Merely by way of example, the terminal device 930 may be connected to the storage device 940 through the network 950, or connected to the storage device 940 directly as illustrated by the bidirectional dotted arrow connecting the terminal device 930 and the storage device 940 in FIG. 9. As still another example, the storage device 940 may be connected to the server 910 through the network 950, or connected to the server 910 directly as illustrated by the bidirectional dotted arrow connecting the storage device 940 and the server 910 in FIG. 9.

In some embodiments, the server 910 may be a single server or a server group. The server group may be centralized or distributed (e.g., the server 910 may be a distributed system). In some embodiments, the server 910 may be local or remote. For example, the server 910 may access information and/or data stored in the terminal device 930, and/or the storage device 940 via the network 950. As another example, the server 910 may be directly connected to the terminal device 930, and/or the storage device 940 to access stored information and/or data. In some embodiments, the server 910 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 910 may be implemented on a computing device 1000 having one or more components illustrated in FIG. 10 in the present disclosure. In some embodiments, the server 910 may be integrated into the terminal device 930. In some embodiments, the server 910 may be integrated into the storage device 940.

In some embodiments, the server 910 may include a processing device 912. The processing device 912 may process information and/or data to perform one or more functions described in the present disclosure. For example, the processing device 912 may obtain a set of candidate transformation results by performing a set of candidate transformation modes on a first block in an image. As still another example, the processing device 912 may determine a target transformation mode for the first block based on the set of candidate transformation results. As still another example, the processing device 912 may determine a residual block based on the first block. As still another example, the processing device 912 may obtain a code stream of the first block by encoding the residual block. In some embodiments, the processing device 912 may include one or more processing engines (e.g., single-core processing engine(s) or multi-core processor(s)). Merely by way of example, the processing device 912 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing device 912 may include the residual block determination module 510, the transformation result determination module 520, the transformation mode determination module 530, and the encoding module 540 as described in FIG. 5. In some embodiments, the processing device 912 may include a source encoder (e.g., the source encoder 120 as illustrated in FIG. 1), a source decoder (e.g., the source decoder 140 as illustrated in FIG. 1), or the like.

In some embodiments, the server 910 may be connected to the network 950 to communicate with one or more components (e.g., the terminal device 930, the storage device 940) of the transformation system 900. In some embodiments, the server 910 may be directly connected to or communicate with one or more components (e.g., the terminal device 930, the storage device 940) of the transformation system 900.

In some embodiments, the terminal device 930 may be configured to receive a signal (e.g., a source signal 110 as illustrated in FIG. 1). In some embodiments, the terminal devices 930 may include a mobile device 930-1, a tablet computer 930-2, a laptop computer 930-3, a telephone 930-4, or the like, or any combination thereof. In some embodiments, the mobile device 930-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

The storage device 940 may store data and/or instructions. In some embodiments, the storage device 940 may store data obtained from the terminal device 930, the processing device 912, and/or an external storage device. In some embodiments, the storage device 940 may store data and/or instructions that the server 910 may execute or use to perform exemplary methods described in the present disclosure. In some embodiments, the storage device 940 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyrisor RAM (T-RAM), a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), a digital versatile disk ROM, etc. In some embodiments, the storage device 940 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 940 may be connected to the network 950 to communicate with one or more components (e.g., the server 910, the terminal device 930) of the transformation system 900. One or more components of the transformation system 900 may access the data or instructions stored in the storage device 940 via the network 950. In some embodiments, the storage device 940 may be directly connected to or communicate with one or more components (e.g., the server 910, the terminal device 930) of the transformation system 900. In some embodiments, the storage device 940 may be part of the server 910. In some embodiments, the storage device 940 may be part of the terminal device 930.

The network 950 may facilitate exchange of information and/or data. In some embodiments, one or more components (e.g., the server 910, the terminal device 930, the storage device 940) of the transformation system 900 may send information and/or data to other component(s) of the transformation system 900 via the network 950. In some embodiments, the network 950 may be any type of wired or wireless network, or combination thereof. Merely by way of example, the network 950 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 950 may include one or more network access points. For example, the network 950 may include wired or wireless network access points (e.g., 950-1, 950-2), through which one or more components of the transformation system 900 may be connected to the network 950 to exchange data and/or information.

It should be noted that the transformation system 900 is merely provided for the purposes of illustration, and is not intended to limit the scope of the present disclosure. For persons having ordinary skills in the art, multiple variations or modifications may be made under the teachings of the present disclosure.

However, those variations and modifications do not depart from the scope of the present disclosure.

Figure 10:
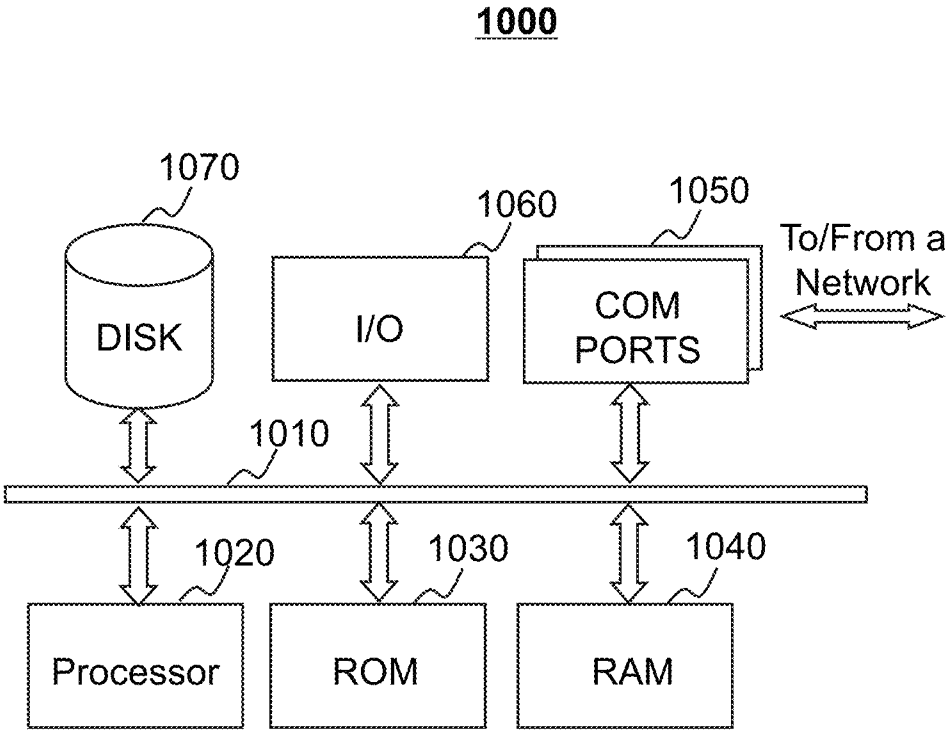
FIG. 10 is a schematic diagram illustrating exemplary hardware and/or software components of an exemplary computing device according to some embodiments of the present disclosure.

FIG. 10 is a schematic diagram illustrating exemplary hardware and/or software components of an exemplary computing device according to some embodiments of the present disclosure. In some embodiments, the server 910 may be implemented on the computing device 1000. For example, the processing device 912 may be implemented on the computing device 1000 and configured to perform functions of the processing device 912 disclosed in this disclosure.

The computing device 1000 may be used to implement any component of the transformation system 900 as described herein. For example, the processing device 912 may be implemented on the computing device 1000, via its hardware, software program, firmware, or a combination thereof. Although only one such computer is shown, for convenience, the computer functions relating to the data storing and/or data retrieving as described herein may be implemented in a distributed fashion on a number of similar platforms to distribute the processing load.

The computing device 1000 may include COM ports 1050 connected to and from a network connected thereto to facilitate data communications. The computing device 1000 may also include a processor 1020, in the form of one or more, e.g., logic circuits, for executing program instructions. For example, the processor 1020 may include interface circuits and processing circuits therein. The interface circuits may be configured to receive electronic signals from a bus 1010, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 1010.

The computing device 1000 may further include program storage and data storage of different forms including, for example, a disk 1070, a read only memory (ROM) 1030, or a random-access memory (RAM) 1040, for storing various data files to be processed and/or transmitted by the computing device 1000. The computing device 1000 may also include program instructions stored in the ROM 1030, the RAM 1040, and/or another type of non-transitory storage medium to be executed by the processor 1020. The methods and/or processes of the present disclosure may be implemented as the program instructions. The computing device 1000 may also include an I/O component 1060, supporting input/output between the computer and other components. The computing device 1000 may also receive programming and data via network communications.

Merely for illustration, only one processor is described in FIG. 10. Multiple processors are also contemplated, thus operations and/or steps performed by one processor as described in the present disclosure may also be jointly or separately performed by the multiple processors. For example, if in the present disclosure the processor of the computing device 1000 executes both operation A and operation B, it should be understood that operation A and operation B may also be performed by two different CPUs and/or processors jointly or separately in the computing device 1000 (e.g., the first processor executes operation A and the second processor executes operation B, or the first and second processors jointly execute operations A and B).

Figure 11:
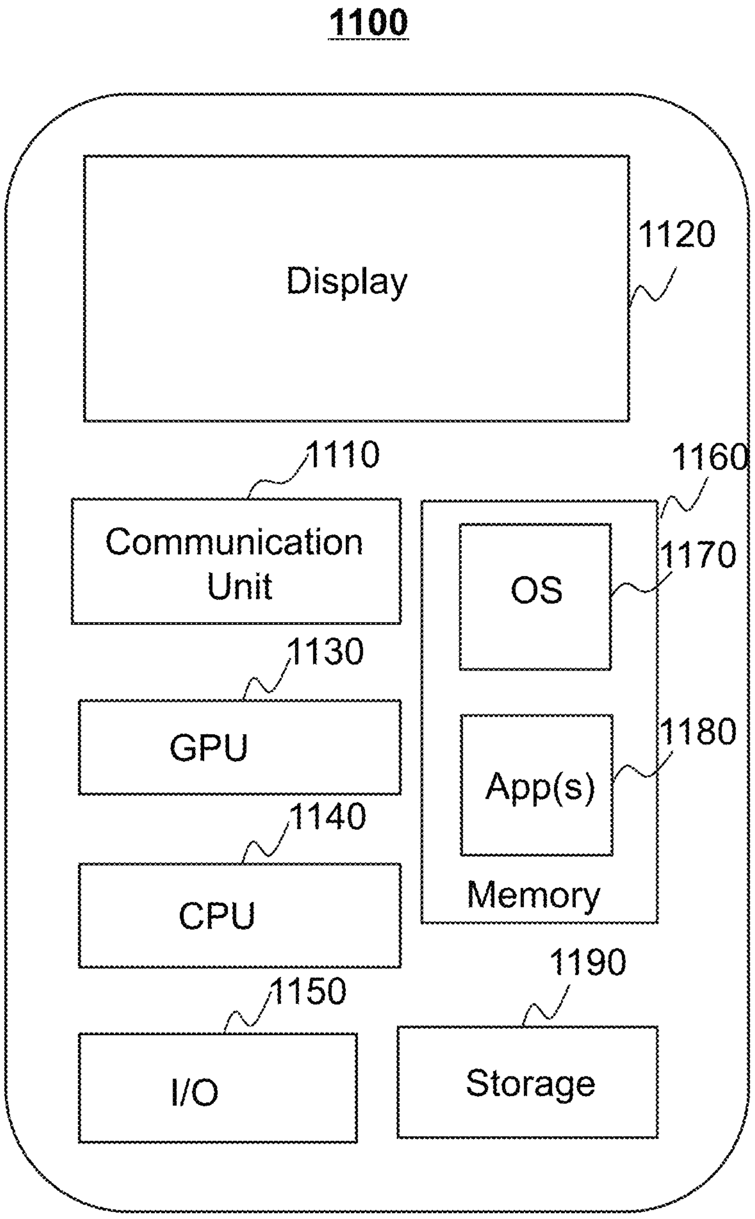
FIG. 11 is a schematic diagram illustrating exemplary hardware and/or software components of an exemplary mobile device on which a terminal device may be implemented according to some embodiments of the present disclosure.

FIG. 11 is a schematic diagram illustrating exemplary hardware and/or software components of an exemplary mobile device on which a terminal device may be implemented according to some embodiments of the present disclosure. In some embodiments, the terminal device 930 may be implemented on the mobile device 1100. As illustrated in FIG. 11, the mobile device 1100 may include a communication unit 1110, a display 1120, a graphic processing unit (GPU) 1130, a central processing unit (CPU) 1140, an I/O 1150, a memory 1160, a mobile operating system (OS) 1170, and a storage 1190. In some embodiments, any other suitable component, including but not limited to a system bus or a controller (not shown), may also be included in the mobile device 1100.

In some embodiments, the mobile operating system 1170 (e.g., iOS™, Android™, Windows Phone™, Harmony OS, etc.) and one or more applications 1180 may be loaded into the memory 1160 from the storage 1190 in order to be executed by the CPU 1140. The applications 1180 may include a browser or any other suitable mobile app for receiving and rendering information relating to data storing and/or data retrieving or other information from the transformation system 900. User interactions with the information stream may be achieved via the I/O 1150 and provided to the processing device 912 and/or other components of the transformation system 900 via the network 950.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for transformation based on an intra block copy (IBC) mode, the method being implemented on a computing device including at least one processor and a storage device, the method comprising:

obtaining a set of candidate transformation results by performing a set of candidate transformation modes on a first block in an image, wherein the set of candidate transformation modes include a first transformation mode, a secondary transformation mode, and a sub-block transformation mode, wherein the performing a set of candidate transformation modes on a first block in an image comprises:

determining whether the first block satisfies a secondary transformation condition;

in response to determining that the first block satisfies the secondary transformation condition, performing the secondary transformation mode, including:

performing a first candidate transformation mode on the first block to generate a transformed first block; and performing a second candidate transformation mode on coefficients of the transformed first block, to complete a secondary transformation operation for the first block;

in response to determining that the first block does not satisfy the secondary transformation condition, determining whether each of one or more second blocks satisfies an implicit skip transformation condition; and in response to determining that the each of the one or more second blocks satisfies the implicit skip transformation condition, determining that the set of candidate transformation modes include an implicit selection of transform skip (ISTS), wherein the each of the one or more second blocks is determined based on the first block; and determining a target transformation mode for the first block based on the set of candidate transformation results, wherein the target transformation mode is configured to encode the first block.

2. The method of claim 1, wherein the determining a target transformation mode for the first block based on the set of candidate transformation results comprises:

determining whether the first block satisfies a sub-block transformation condition; and in response to determining that the first block satisfies the sub-block transformation condition, selecting the target transformation mode from a plurality of candidate sub-block transformation modes.

3. The method of claim 2, wherein the selecting the target transformation mode from a plurality of candidate sub-block transformation modes comprises:

determining a plurality of second blocks based on the first block; and determining the target transformation mode by comparing a plurality of costs corresponding to the plurality of candidate sub-block transformation modes of the plurality of second blocks.

4. The method of claim 3, wherein the determining a plurality of second blocks based on the first block comprises:

dividing the first block into a plurality of sub-blocks based on a division mode; and designating the plurality of sub-blocks as the plurality of second blocks.

5. The method of claim 1, wherein the performing a second candidate transformation mode on coefficients of the transformed first block, to complete a secondary transformation operation for the first block includes:

performing the second candidate transformation mode on a 4×4 transformation block in an upper left corner of the transformed first block after the first candidate transformation mode is performed on the first block, wherein the first candidate transformation mode includes a discrete cosine transform, the discrete cosine transform being performed on the first block only once; and the secondary transformation condition is satisfied that the first candidate transformation mode is performed on the first block and the first candidate transformation mode is not an implicit transformation mode.

6. The method of claim 1, wherein the performing a second candidate transformation mode on coefficients of the transformed first block comprises:

determining whether a block vector of the first block in a horizontal direction is 0, wherein the block vector is a position offset vector between the first block and a matching block corresponding to the first block; and in response to determining that the block vector of the first block in the horizontal direction is not 0, performing the second candidate transformation mode on the coefficients of the transformed first block in the horizontal direction.

7. The method of claim 1, wherein the performing a second candidate transformation mode on coefficient of the transformed first block comprises:

determining whether a block vector of the first block in a vertical direction is 0, wherein the block vector is a position offset vector between the first block and a matching block corresponding to the first block; and in response to determining that the block vector of the first block in the vertical direction is not 0, performing the second candidate transformation mode on the coefficients of the transformed first block in the vertical direction.

8. The method of claim 5, wherein the determining a target transformation mode for the first block based on the set of candidate transformation results comprises:

comparing a first cost corresponding to the first candidate transformation mode and a second cost corresponding to the second candidate transformation mode; and designating one of the first candidate transformation mode and the second candidate transformation mode whose cost is smaller among the first cost and the second cost as the target transformation mode.

9. The method of claim 1, further comprising:

in response to determining that the first block satisfies the implicit selection of transform skip (ISTS), determining that the set of candidate transformation modes include the ISTS, wherein an ISTS condition is associated with attributes of a residual block, the residual block is determined based on the first block.

10. The method of claim 9, further comprising:

in response to determining that the first block does not satisfy the ISTS condition, determining that the set of candidate transformation modes include at least one of the $DCT_i$ or the $DST_i$, wherein $1 \leq i \leq 8$.

11. A system for transformation based on an intra block copy (IBC) mode, comprising:

at least one storage device configured to store a set of program instructions; and at least one processor coupled to the at least one storage device, wherein the at least one processor is configured to execute the program instructions, which causes the system to perform operations including:

obtaining a set of candidate transformation results by performing a set of candidate transformation modes on a first block in an image, wherein the set of candidate transformation modes include a first transformation mode, a secondary transformation mode, and a sub-block transformation mode, wherein the performing a set of candidate transformation modes on a first block in an image comprises:

determining whether the first block satisfies a secondary transformation condition;

in response to determining that the first block satisfies the secondary transformation condition, performing the secondary transformation mode, including:

performing a first candidate transformation mode on the first block to generate a transformed first block; and performing a second candidate transformation mode on coefficients of the transformed first block, to complete a secondary transformation operation for the first block;

in response to determining that the first block does not satisfy the secondary transformation condition, determining whether each of one or more second blocks satisfies an implicit skip transformation condition; and in response to determining that the each of the one or more second blocks satisfies the implicit skip transformation condition, determining that the set of candidate transformation modes include an implicit selection of transform skip (ISTS), wherein the each of the one or more second blocks is determined based on the first block; and determining a target transformation mode for the first block based on the set of candidate transformation results, wherein the target transformation mode is configured to encode the first block.

12. A method for transformation based on an intra block copy (IBC) mode, the method being implemented on a computing device including at least one processor and a storage device, the method comprising:

obtaining a code stream of a first block by encoding the first block based on a target transformation mode, wherein:

the code stream includes a syntax element, the syntax element indicates a skip residual mode being performed on the first block, in the skip residual mode, no transformation, quantization, or encoding operations are performed on the first block, a predicted value of the first block is determined as a reconstructed value of the first block, and before the obtaining a code stream of a first block by encoding the first block based on a target transformation mode, the method comprises:

obtaining a transformation mode with a smallest cost; and determining the target transformation mode based on the transformation mode with the smallest cost, comprising:

determining whether the first block satisfies a secondary transformation condition;

in response to determining that the first block satisfies the secondary transformation condition, performing the secondary transformation mode, including:

performing a first candidate transformation mode on the first block to generate a transformed first block, wherein the first candidate transformation mode includes a discrete cosine transform;

performing a second candidate transformation mode on coefficients of the transformed first block, to complete a secondary transformation operation for the first block;

in response to determining that the first block does not satisfy the secondary transformation condition, determining whether each of one or more second blocks satisfies an implicit skip transformation condition; and in response to determining that the each of the one or more second blocks satisfies the implicit skip transformation condition, determining that the set of candidate transformation modes include an implicit selection of transform skip (ISTS), wherein the each of the one or more second blocks is determined based on the first block; and obtaining the transformation mode with the smallest cost by comparing a cost of the first candidate transformation mode and a cost of the second candidate transformation mode.

13. The method of claim 12, wherein the syntax element includes a label of the skip residual mode, and the label indicates whether the skip residual mode is performed on the first block.

14. The method of claim 12, wherein the obtaining a code stream of a first block by encoding the first block comprises:

determining a residual corresponding to the first block; and obtaining the code stream of the first block by encoding the residual.

15. The method of claim 14, wherein the determining a residual corresponding to the first block comprises:

obtaining an actual value of the first block and a predicted value of the first block, wherein the predicted value of the first block is obtained in an inter prediction process; and determining the residual based on a difference between the actual value of the first block and the predicted value of the first block.

16. The method of claim 12, wherein before the obtaining a code stream of a first block by encoding the first block based on a target transformation mode, the method further comprises:

determining whether a cost of the skip residual mode is smaller than a cost of the transformation mode with the smallest cost; and in response to determining that the cost of the skip residual mode is smaller than the cost of the transformation mode with the smallest cost, determining the skip residual mode as a target transformation mode with the smallest cost.

17. The method of claim 12, wherein the obtaining a transformation mode with a smallest cost further comprises:

determining whether the first block satisfies an implicit selection of transform skip condition, wherein the implicit selection of transform skip refers to a process of shifting and scaling a residual without transforming the residual;

in response to determining that the first block satisfies the implicit selection of transform skip condition, performing an implicit selection of transform skip transformation mode on the first block;

performing a discrete cosine transform on the first block; and obtaining the transformation mode with the smallest cost by comparing a cost of the implicit selection of transform skip transformation mode and a cost of the discrete cosine transform.

18. The method of claim 12, wherein the obtaining a transformation mode with a smallest cost further comprises:

determining whether the first block satisfies an implicit selection of transform skip condition;

in response to determining that the first block satisfies the implicit selection of transform skip condition, performing an implicit selection of transform skip transformation mode on the first block;

performing a discrete cosine transform on the first block;

determining whether the first block satisfies a sub-block transformation condition;

in response to determining that the first block satisfies the sub-block transformation condition, performing a sub-block transformation mode on the first block; and obtaining the transformation mode with the smallest cost by comparing a cost of the implicit selection of transform skip transformation mode, a cost of the discrete cosine transform, and a cost of the sub-block transformation mode.

19. The method of claim 13, further comprising:

in response to determining that a value of the label of the skip residual mode is 1, transforming a current coding unit based on the skip residual mode, wherein a loop filtering operation is not performed on the first block; and in response to determining that a value of the label of the skip residual mode is 0, transforming the current coding unit based on the IBC mode.

* * * * *